United States Patent
Ross et al.

(10) Patent No.: US 6,258,481 B1
(45) Date of Patent: *Jul. 10, 2001

(54) BATTERY TERMINAL BUSHING HAVING FRONTAL ACCESS TO BATTERY TERMINATION

(75) Inventors: William J. Ross, Mukwonago; Guy L. Pfeifer, Milwaukee, both of WI (US)

(73) Assignee: C&D/Charter Holdings, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,235

(22) Filed: Oct. 15, 1998

(51) Int. Cl.[7] .............................. H01M 2/02; H01M 2/08; H01M 2/04
(52) U.S. Cl. ..................... 429/180; 429/178; 429/179; 429/175; 429/170; 429/181; 429/183
(58) Field of Search ................................. 429/175, 178, 429/179, 180, 181, 183, 170

(56) References Cited

U.S. PATENT DOCUMENTS

| | | | |
|---|---|---|---|
| 4,337,301 | * | 6/1982 | Rorer et al. ........................ 429/179 |
| 4,424,264 | * | 1/1984 | McGuire et al. .................... 429/179 |
| 4,425,414 | * | 1/1984 | Solomon ............................. 429/179 |
| 4,478,919 | * | 10/1984 | Tiegel ................................. 429/179 |
| 4,645,725 | * | 2/1987 | Kump et al. ........................ 429/179 |
| 4,693,949 | * | 9/1987 | Kellett et al. ...................... 429/178 |
| 4,701,386 | * | 10/1987 | Kump et al. ........................ 429/179 |
| 4,752,543 | * | 6/1988 | Anderson et al. .................. 429/179 |
| 4,879,191 | | 11/1989 | Sindorf ............................... 429/181 |
| 5,281,493 | | 1/1994 | Jones ................................... 429/179 |

* cited by examiner

Primary Examiner—Gabrielle Brouillette
Assistant Examiner—Tracy Dove
(74) Attorney, Agent, or Firm—Duane Morris & Heckscher LLP

(57) ABSTRACT

A battery is delineated comprising, in combination, a battery cover having a Cast on Strap (COS) post extending into an aperture located in a top surface of the battery cover; and a battery terminal bushing, integrally coupled to the battery cover, having a first portion fitting about and coupled to the COS post, and having a second portion extending away from the first portion approximately orthogonally. The second portion of the battery terminal bushing extends through the battery cover and is accessible via an aperture located on a side surface of the battery cover, thereby providing frontal access to battery termination.

18 Claims, 2 Drawing Sheets

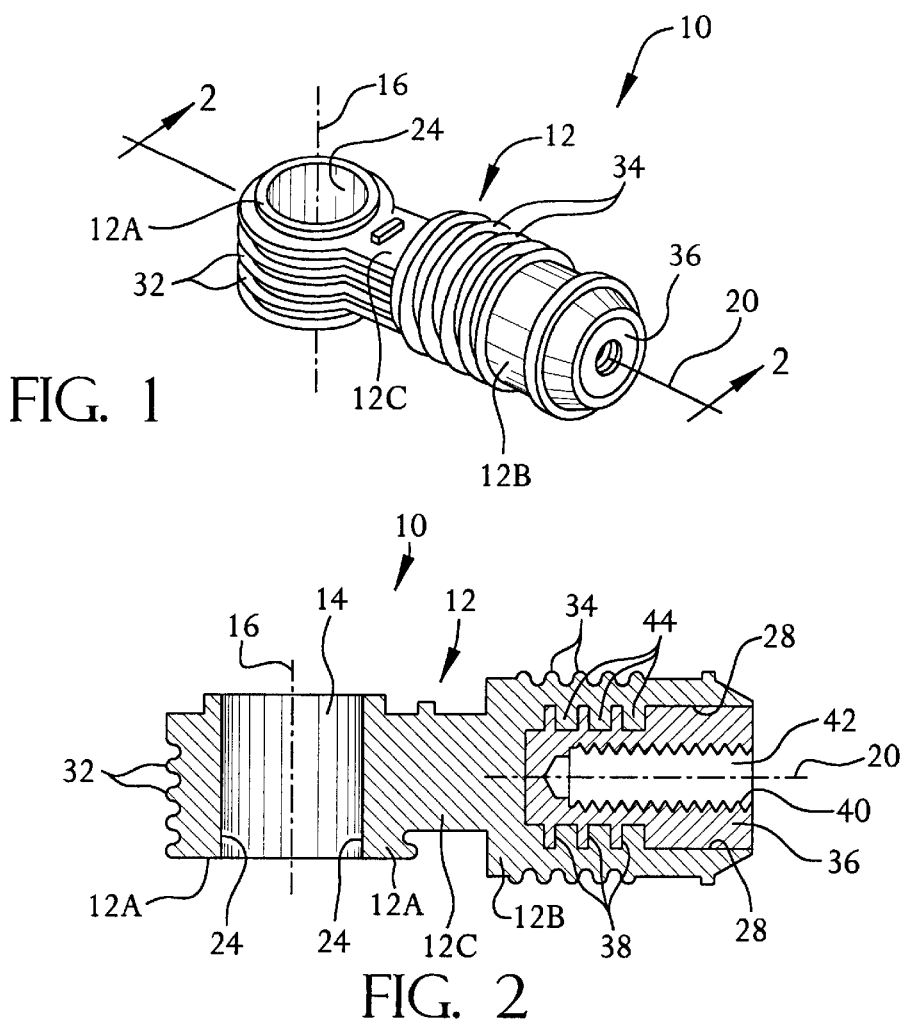

BATTERY TERMINAL BUSHING HAVING FRONTAL ACCESS TO BATTERY TERMINATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to bushings for battery terminals, and more specifically pertains to a battery terminal bushing incorporated into a battery cover and having a sealed, encapsulated bend that allows for frontal access to the battery termination.

Batteries have been in existence for a number of years. Moreover, batteries are produced in a variety of different forms. For example, one common variety of battery is provided with battery terminals vertically extending from the top of the battery enclosure. Such types of batteries are commonly found in automobiles. Those skilled in the battery arts generally refer to such batteries as standard top termination batteries.

In certain industries, such as the telecommunications industry, standard top termination batteries are not preferred. Rather, in such industries, like the telecommunications industry, batteries having frontal termination are preferred. Frontal termination batteries are those having their points of access for making connection to draw power from the battery located on a side (as opposed to a top) portion of the battery. In spite of the general affinity for frontal (rather than top) termination in the telecommunications industry, standard top termination batteries are still widely used in this industry; however, these batteries are usually modified to provide frontal termination.

In particular, those in the telecommunications industry are presently integrating termination transformation kits to standard top termination batteries to transform them into pseudo-frontal termination batteries. Typically, the use of such kits involves interconnecting one or more members between the top of the battery where the battery terminals are located, and a side portion of the battery where it is preferred to have power drawn from the battery. There is added cost in procuring a kit to facilitate running power from a standard top termination battery to a side portion of the battery. Additionally, such a kit typically has more than one piece, increasing the likelihood of losing one of the pieces and rendering the kit useless without a replacement piece. Moreover, attaching portions of such kits to the top of the batteries necessitates having greater space in between adjacent racks of batteries. In this regard, it is common in the telecommunications industry to find a series of vertically stacked racks, each containing a plurality of batteries. There would be considerable space savings if such kits were not needed.

Therefore, there existed a need to provide an improved battery terminal bushing integrally connected to a battery cover, having a portion connected to a Cast on Strap post in a battery, and having another portion extending to a side of the battery cover to permit frontal termination. Such an improved battery terminal bushing obviates the present practice of integrating termination transformation kits with standard top termination batteries.

BRIEF SUMMARY OF THE INVENTION

One embodiment of the present invention is a device comprising, in combination, a battery terminal bushing; and a body of the battery terminal bushing forming a first cavity situated about a first axis, and forming a second cavity situated about a second axis substantially orthogonal to the first axis. Having the substantially orthogonal arrangement, it will be seen, permits frontal termination of a battery without the need for a supplemental kit. The body includes a first portion having a substantially cylindrical external shape with an internal surface forming the first cavity, and a second portion having a substantially cylindrical external shape with an internal surface forming the second cavity. The internal surface forming the first cavity is substantially cylindrical, and the internal surface forming the second cavity is substantially cylindrical. The body further includes a third portion integrally coupled in between the first and second portions, and having a longitudinal axis substantially parallel to the second axis. The third portion creates a distance between the first portion where, ultimately, a COS post will reside, and the second portion where frontal termination is desired. Preferably, the first and second cavities are axially centered about the first and second axes, respectively. Outer surfaces of the first and second portions form acid rings. The acid rings help limit or prevent electrolyte seepage from the battery through the battery terminal bushing and battery cover. Preferably, the first member consists of lead, as it stands up well to exposure with battery acid.

The device further comprises an insert integrally coupled to the internal surface forming the second cavity. The insert has a substantially cylindrical outer surface shape with rings, and an internal surface forming a third cavity situated about the second axis. The internal surface forming the second cavity is provided with rings for complementary inter-engagement with the rings of the outer surface of the insert. Preferably, the insert consists of brass or copper, as these materials demonstrate good conductive characteristics. The internal surface forming the third cavity is preferably threaded to facilitate connection, at this frontal termination point of the battery, to an external load line connector.

In an alternative embodiment to the present invention, a battery cover assembly is disclosed for a battery having positive and negative plates joined to respective upright posts, comprising a molded cover; and a pair of terminal bushings molded into the battery cover wherein each bushing has a body with a first portion adapted to fit about and connect to a respective post, and has a second portion extending away from the first portion approximately orthogonally. The second portions of the terminal bushings extend through the cover and are accessible via apertures located on a side surface of the cover. Each terminal bushing body forms a first cavity wherein a respective post is inserted, and forms a second cavity situated about a second axis substantially orthogonal to an axis of the respective post. The first portion has a substantially cylindrical external shape with an internal surface forming the first cavity, and the second portion has a substantially cylindrical external shape with an internal surface forming the second cavity. The internal surface forming the first cavity is substantially cylindrical, and the internal surface forming the second cavity is substantially cylindrical. Each body further includes a third portion integrally coupled in between the first and second portions, and having a longitudinal axis substantially parallel to the second axis. The first and second cavities are axially centered about the axis of the respective post and the second axis, respectively. Note that an outer surface of the first portion forms acid rings, and an outer surface of the second portion forms acid rings. The acid rings help limit or prevent electrolyte seepage from the battery through the battery terminal bushing and battery cover. Preferably, the first member consists of lead, as it stands up well to exposure with battery acid.

The battery cover assembly embodiment further comprises an insert integrally coupled to the internal surface forming the second cavity. The insert has a substantially cylindrical outer surface shape with rings, and an internal surface forming a third cavity situated about the second axis. The internal surface forming the second cavity is provided with rings for complementary inter-engagement with the rings of the outer surface of the insert. Preferably, the second member consists of brass or copper, as these materials demonstrate good conductive characteristics. Lastly, the internal surface forming the third cavity is preferably threaded to facilitate connection, at this frontal termination point of the battery, to an external load line connector.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 1 is a perspective view of the battery terminal bushing of the present invention;

FIG. 2 is a cross-sectional view taken along the line 2—2 of FIG. 1;

FIG. 3 is a perspective view of part of a battery cover that incorporates the new battery terminal bushings of the present invention;

DETAILED DESCRIPTION OF THE INVENTION

Figure 4:
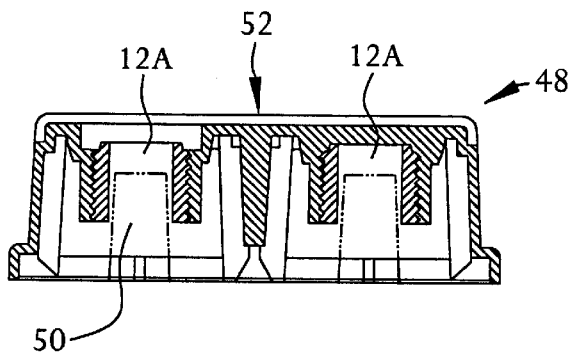
FIG. 4 is a cross-sectional view taken along the line 4—4 of FIG. 3.

Referring to FIGS. 1 and 2, the battery terminal bushing of the present invention is shown and generally designated by reference number 10. The battery terminal bushing 10 has a body 12 with a first cylindrical portion 12A having a first cavity 14 defined by a circular cylindrical surface 24 situated about a first axis 16. The body 12 has a second cylindrical portion 12B with a second cavity defined by a circular cylindrical surface 28 situated about a second axis 20 located substantially orthogonal to the first axis 16. An intermediate portion 12C integrally joins the first and second portions 12A and 12B.

In the preferred embodiment of the present invention, both the first cavity 14 and the second cavity are axially centered about the first and second axes 16 and 20, respectively; however, those skilled in the art realize that the first 14 and second cavities need not necessarily be perfectly centered axially about the first 16 and second 20 axes. An outer surface of the first portion 12A is formed into acid rings 32. Similarly, an outer surface of the second portion 12B is formed into acid rings 34. Those skilled in the art understand that acid rings, such as 32 and 34, help in preventing battery acid leakage along the bushing's outer surfaces by providing a torturous path for any such battery leakage, thereby making it more difficult for battery acid leakage to occur.

Still with reference to FIGS. 1 and 2, the bushing 10 further comprises an insert 36 integrally coupled to the internal surface 28 and filling the second cavity. The insert 36 is locked into the second cavity by the inter-engagement of rings 38 on the insert 36 and rings 44 projecting inwardly from the surface 28. A threaded bore 42 extends into the insert 36.

Again with reference to FIGS. 1 and 2, in the preferred embodiment, the body 12 is preferably made from lead, while the insert 36 is preferably made from either brass or copper. Lead is generally selected for use in making the body 12 because lead stands up well to battery acid exposure; however; other suitable materials well known to those skilled in the art may be used. Similarly, copper or brass are generally selected for use in making the insert 36 because of their good conductive traits; however, other suitable materials well known to those skilled in the art may be used. The bushing 10 itself is preferably made using an insert casting type process. Those skilled in the art understand the term "insert casting"; however, the following simplified description is provided of the general manner of making the bushing 10. In particular, the insert 36 would be fabricated using brass, copper, or some other suitable material in any one of a number of well known manners. Of course, the preferred shape of the insert 36 would be substantially as shown in FIGS. 1 and 2; however, those skilled in the art understand that changes to the shape of the insert 36 could be made, if so desired. Next, the solidified insert 36 would be placed into a mold. Then, the molten lead would be poured around the insert 36 in order to form the body 12. When removed from the insert casting mold and cooled, the bushing 10 is substantially a single piece; however, it is critical to remember that the bushing 10 actually comprises the body 12 and the insert 36.

Now referring to FIG. 3, a battery cover 48 is shown. The battery cover includes a pair of bushings 10 that have been molded into the battery cover 48. The battery cover 48 may be made from any suitable material; however, in the preferred embodiment, it is fabricated from polypropylene copolymer. Note that the battery cover 48 includes a plurality of venting ports 49 for automatically releasing gasses that have built up within the battery to a sufficient pressure to lift reliefs (not shown) integral with the vent ports 49. Also, in a top surface 52 of the battery cover 48, the first cylindrical portion 12A of each bushing 10 is visible. Additionally, in a side surface 54 of the battery cover 48, the second cylindrical portion 12B and insert 36 of each bushing 10 is also visible. One of the critical features of bushings 10 is that they provide sealed, encapsulated bends that allow for frontal access to the battery termination. In the preferred embodiment, the sealed, encapsulated bend is a 90 degree bend; however, those skilled in the art understand that the angle between the first cylindrical portion 12A and the second cylindrical portion 12B of the bushing 10 may be greater or less than 90 degrees without departing from the scope of the present invention. The openings in top surface 52 to the first cylindrical portions 12A are typically covered.

Referring now to FIG. 4, a cross-section taken along line 4—4 from FIG. 3 is shown. In FIG. 4, the first cylindrical portions 12A of the pair of bushings 10 are shown inserted into the battery cover 48. A cast on strap (COS) post 50 is shown in phantom within each of the first cylindrical portions 12A. Due to the nature of this particular Figure, the frontal termination is not shown.

Figure 5:
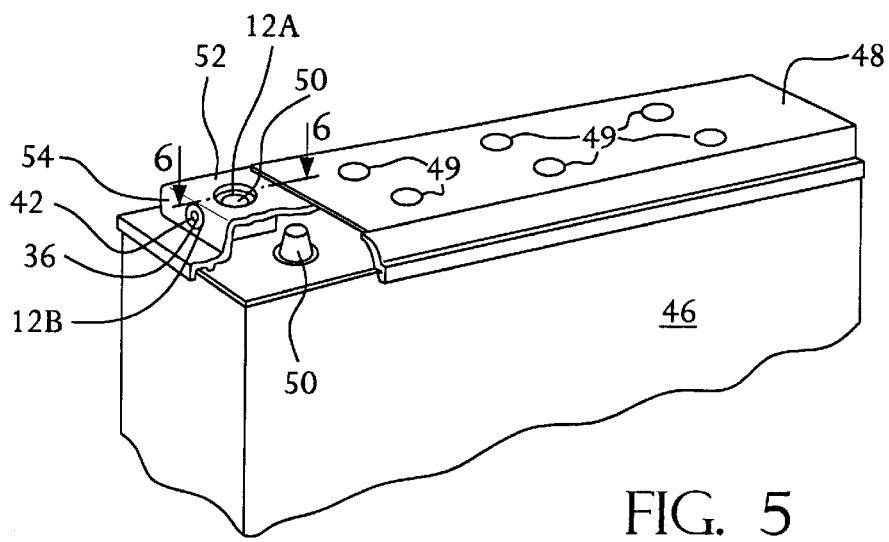
FIG. 5 is a perspective view of part of a battery including a battery cover incorporating the battery terminal bushings of the present invention having frontal access to battery termination.

Referring now to FIG. 5, a battery 46 is partially shown. Those skilled in the art understand the manner of making and using any one of a plurality of different batteries, including batteries used in the telecommunications industry. In this regard, the bushing 10 can be used with virtually any type of battery. In general, a battery (e.g., 46) includes a plurality of positive and negative plates, as well as a plurality of separators. The positive plates are connected to a positive COS post, while the negative plates are connected to a negative COS post. Additionally, the battery plates are immersed in battery electrolytic fluid, such as sulfuric acid. With the battery cover 48 having the bushings 10 integrally coupled thereto, the battery cover 48 is placed over the COS posts 50. Each COS post 50 is connected to its respective bushing 10 in a manner well known to those skilled in the art, such as an Automatic Post Burning process (APB). A portion of the battery cover 48 has been removed from the Figure in order to more clearly show one of the COS posts 50.

Still with reference to FIG. 5, the battery 46 includes the battery cover 48 having a COS post 50 extending into an aperture (not shown) located in the top surface 52 of the battery cover 48. Battery 46 further includes the battery terminal bushing 10, integrally coupled to the battery cover 48. The battery terminal bushing 10 has a first cylindrical portion (see 12A in FIGS. 1 and 2) fitting about and coupled to the COS post 50, and a second cylindrical portion (see 12B in FIGS. 1 and 2) extending away from the first cylindrical portion 12A approximately orthogonally. The second cylindrical portion 12B and insert 36 extend through the battery cover 48 and are accessible via an aperture located in the side surface 54 of battery cover 48. In battery 46, a pair of bushings 10 are incorporated. Each insert 36 has a threaded bore 42 accessible at the side surface 54 of the battery cover 48 in order to provide the required frontal access to battery termination. In FIG. 5, the frontal access of each bushing 10 is not precisely flush with the side edge of the battery 46. Nonetheless, the face of insert 36 is in a plane substantially parallel with a side surface of the battery 46.

Figure 6:
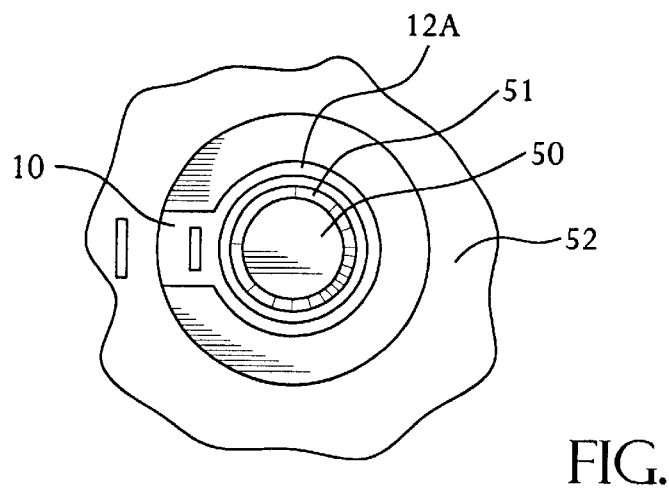
FIG. 6 is a plan view of a portion of the top surface of the battery cover.

Referring to FIG. 6, a plan view of a portion of the top surface 52 of the battery cover 48 is shown. In this view, the merger between a COS post 50 and a bushing 10 is shown. Connection 51, between first cylindrical portion 12A and COS post 50, is preferably made using an APB type process; however, other well known processes may be implemented if so desired.

It should be understood that the methods and apparatuses described above are only exemplary and do not limit the scope of the invention, and that various modifications could be made by those skilled in the art that would fall under the scope of the invention. For example, acid rings may or may not be used on parts of or the whole of bushings 10. To apprise the public of the scope of this invention, we make the following claims:

We claim:
1. A battery comprising:
a molded cover comprising first and second portions; and
a pair of terminal bushings molded into the first portion of the batter cover, each bushing having a unitary body with a first substantially cylindrical portion adapted to fit about and connect to a respective post of the battery, a second substantially cylindrical portion extending away from said first portion orthogonally, and a third portion integrally coupled between said first and second portions,
wherein the second portion of the battery cover protects the pair of terminal bushings from electrolyte disposed in the battery.

2. The battery of claim 1, wherein said first and second portions of each said bushing include acid rings for accepting molded plastic material of the first portion of the molded cover and creating a sea between the respective first and second portions and the first portion of the molded cover.

3. The battery of claim 2, wherein said third portion of each bushing is not covered with molded plastic material of the first portion of the molded cover.

4. A battery cover assembly for a battery having positive and negative plates joined to respective upright posts, comprising:
a molded cover comprising first and second portions; and
a pair of terminal bushings molded into the first portion of the battery cover, each bushing having a unitary body with a first substantially cylindrical portion adapted to fit about and connect to a respective post, and having a second substantially cylindrical portion extending away from said first portion orthogonally, wherein said second portions of said terminal bushings extend through said cover and are accessible via apertures located on a side surface of said cover, and
wherein said first and second portions of each said bushing include acid rings for accepting molded plastic material of the first portion of the molded cover and creating a seal between the respective first and second portions and the first portion of the molded cover, and
wherein the second portion of the battery cover underlies the first portion of the battery cover and the pair of terminal bushings.

5. The battery cover assembly of claim 4 wherein each terminal bushing body forms a first cavity wherein a respective post is inserted, and forms a second cavity situated about a second axis substantially orthogonal to an axis of said respective post.

6. The battery cover assembly of claim 5 wherein said first portion has a substantially cylindrical external shape with an internal surface forming said first cavity, and said second portion has a substantially cylindrical external shape with an internal surface forming said second cavity.

7. The battery cover assembly of claim 6 wherein said internal surface forming said first cavity is substantially cylindrical, and wherein said internal surface forming said second cavity is substantially cylindrical.

8. The battery cover assembly of claim 6 wherein each body further includes a third portion integrally coupled in between said first and second portions, and having a longitudinal axis substantially parallel to said second axis.

9. The battery cover assembly of claim 5 wherein said first and second cavities are axially centered about said axis of said respective post and said second axis, respectively.

10. The battery cover assembly of claim 6 wherein an outer surface of said first portion forms acid rings, and wherein an outer surface of said second portion forms acid rings.

11. The battery cover assembly of claim 5 wherein each body consists of lead.

12. The battery cover assembly of claim 6 further comprising an insert integrally coupled to said internal surface forming said second cavity.

13. The battery cover assembly of claim 12 wherein said insert has a substantially cylindrical outer surface shape with rings, and an internal surface forming a third cavity situated about said second axis.

14. The battery cover assembly of claim 13 wherein said internal surface forming said second cavity is provided with rings for complementary inter-engagement with said rings of said outer surface of said insert.

15. The battery cover assembly of claim 12 wherein said insert consists of one of brass and copper.

16. The battery cover assembly of claim 13 wherein said internal surface forming said third cavity is threaded.

17. The battery cover assembly of claim 4, wherein each of the pair of terminal bushings are completely encased within the molded cover except for an upper area of the first portion and a side area of the second portion.

18. A battery cover assembly for a battery having positive and negative plates joined to respective upright posts, comprising:

a molded cover comprising first and second portions; and a pair of terminal bushings molded into the first portion of the battery cover, each bushing having a unitary body including a first substantially cylindrical portion with an internal surface forming a first cavity situated about a first axis, a second substantially cylindrical portion with an internal surface forming a second cavity situated about a second axis substantially orthogonal to said first axis, and a third portion integrally coupled between said first and second portions, and having a longitudinal axis substantially parallel to said second axis, wherein at least second portions of each said bushing include cylindrical acid rings for accepting molded plastic material of the first portion of the molded cover and creating a seal between the respective first and second portions and the first portion of the molded cover, and wherein the second portion of the battery cover underlies the first portion of the battery cover and the pair of terminal bushings.

* * * * *